United States Patent [19]

Bruns

[11] Patent Number: 5,082,186

[45] Date of Patent: Jan. 21, 1992

[54] CHAFF SPREADER

[76] Inventor: Mark W. Bruns, P.O. Box 33, Gibbon, Minn. 55335

[21] Appl. No.: 443,570

[22] Filed: Nov. 29, 1989

[51] Int. Cl.[5] .................................. A01C 17/00
[52] U.S. Cl. ............................. 239/682; 239/667; 239/673; 239/688
[58] Field of Search ............ 239/667, 681, 682, 687, 239/688, 673, 684, 650, 651, 672, 674; 460/79

[56] References Cited

U.S. PATENT DOCUMENTS

| 686,185 | 11/1901 | Abbott | 239/667 |
|---|---|---|---|
| 921,101 | 5/1909 | Griswold | 239/687 |
| 2,031,540 | 2/1936 | Macaulay | 239/667 |
| 2,967,056 | 1/1961 | D'Amato | |
| 3,417,926 | 12/1968 | De Vorak | |
| 3,539,113 | 11/1970 | Tyler | 239/673 |
| 4,367,848 | 1/1983 | Ehmke et al. | |
| 4,725,005 | 2/1988 | Wiegelmann | 239/682 |
| 4,836,456 | 6/1989 | van der Lely | 239/682 |

FOREIGN PATENT DOCUMENTS

| 1005696 | 3/1983 | U.S.S.R. | 239/682 |
|---|---|---|---|
| 1024029 | 6/1983 | U.S.S.R. | 239/673 |

Primary Examiner—Andres Kashnikow
Assistant Examiner—Christopher G. Trainor

[57] ABSTRACT

A pair of straw and chaff spreaders for a combine are operable to distribute straw and chaff in an even and wide spread pattern on the ground behind the combine. Each spreader has an upright shaft drivably coupled to upper and lower dishes. Flexible arms on the upper disk distribute straw. Rigid channel shaped arms on the lower disk propels chaff and small particulate materials in the pattern. The turning channel shaped arms also generate an air stream which distributes straw and chaff in the wide spread pattern.

17 Claims, 3 Drawing Sheets

CHAFF SPREADER

FIELD OF INVENTION

The invention relates to material spreaders for use with combines to distribute straw and chaff behind the combine. The invention is particularly directed to rotatable spreaders mounted on the rear of a combine for spreading straw and chaff in a relatively wide and even spread pattern behind the combine.

BACKGROUND OF INVENTION

Self propelled and tractor driven combines are used to harvest small grains, beans, corn and like crops. The combines function to separate the grains from plant materials, such as straw, chaff, and other plants that are cut by the combine. The straw and chaff along with the other materials are discharged through a open back end of the combine into windrows on the ground and stubble behind the combine. Straw choppers having horizontal rotating drums carrying a plurality of knives have been attached to the rear combine to cut up the straw and spread the straw onto the ground behind the combine. The drums are belt driven and use substantial amounts of power to cut the straw. The chaff flows through the straw cutters into generally narrow rows behind the combine. One or more vertically rotating straw spreaders have been mounted on the back of combines to spread straw. These cutters use a single disk to distribute the straw. The chaff flows out of the combine into relatively narrow rows on the ground. This concentration of chaff results in rows of small particulate materials and uneven chemicals on the ground.

SUMMARY OF INVENTION

The invention is directed to a straw and chaff spreader for a combine that rotates about a generally upright axis for distributing both straw and chaff in relatively wide and even pattern behind a combined. The spreader is suitable for use with combines that harvest small grains, corn and beans. A pair of counter rotating vertical spreaders are mounted on the rear of the combine behind the material discharge opening. The spreaders are concurrently driven with conventional mechanical drives such as belt and pulleys or chain and sprockets. Each spreader has an upper disk carrying a plurality of outwardly directed arms that distribute the straw in a relatively wide pattern. A second or lower disk is positioned below the upper disk. The second disk supports a plurality of generally channel shaped arms that extend beyond the outer peripheral edge of the disk. A second disk along with the channel shaped arms pick up and propel chaff and small particulate materials rearwardly behind the combine in a relatively wide and even spread pattern. The turning channel shaped arms generate a rearwardly directed flow of air that carries the chaff, fine particulate materials and straw rearwardly of the combine into a relatively wide and even pattern behind the combined.

In a preferred embodiment of the straw and chaff spreader, the combine has a rear section with an opening for discharging straw and chaff onto the ground. A pair of straw and chaff spreaders are rotatably mounted on the combined rearwardly of the opening. The straw and chaff spreaders are rotated about separate upright axes in counter rotating directions to spread both the straw chaff and other material flowing from the combine into a relatively wide and even spread pattern behind the combine. Each straw and chaff spreader has a generally upright shaft that is rotatably mounted on the frame of the combine. A power drive, such as a belt and pulley drive or chain and sprocket drive, is used to rotate the shaft about its upright longitudinal axis. A first disk and a second disk have central holes for accommodating the shaft. The second disk is mounted on the shaft below the first disk for rotation with the shaft. A spacer sleeve is located between the first and second disks to space the disks vertically apart. Rod fastners are secured to the first and second disks to hold the disks in firm engagement with opposite ends of the sleeve. The opposite ends of the sleeve engage circular portions of the first and second disks concentric with the axes of rotation of the shaft to rotatably balance the disks and sleeve as well as stabilize the disks on the sleeve. An upwardly tapered cone member surrounding the shaft if mounted on top of the first disk. The cone member directs the straw outwardly onto a plurality of arms secured to the first disk. Each of the arms has an outer end portion that extends outwardly from the outer peripheral edge of the first disk. The terminal portions of the arms can be turned upwardly. A plurality of channel shaped arms are mounted on the lower disk. Each channel shaped arm has forwardly directed flanges on opposite sides of a channel that is open in a forward direction relative to the direction of rotation of the spreader. The channel shaped arms have outer end portions that extend outwardly from the outer peripheral edge of the second disk. The inner and outer ends of the channels are open to allow air, chaff and particulate materials to flow along the channels with the air streams as generated by the turning channel shaped arms. The channel shaped arms are made of ultra high molecular weight polyethelene which has a low coefficent of friction and smooth surfaces so that the flow of chaff and particulate materials is smooth and continuous.

The objects and advantages of the straw and chaff spreader of the invention are embodied in the following detailed description of a preferred embodiment thereof.

DESCRIPTION OF PREFERRED EMBODIMENT

Figure 1:
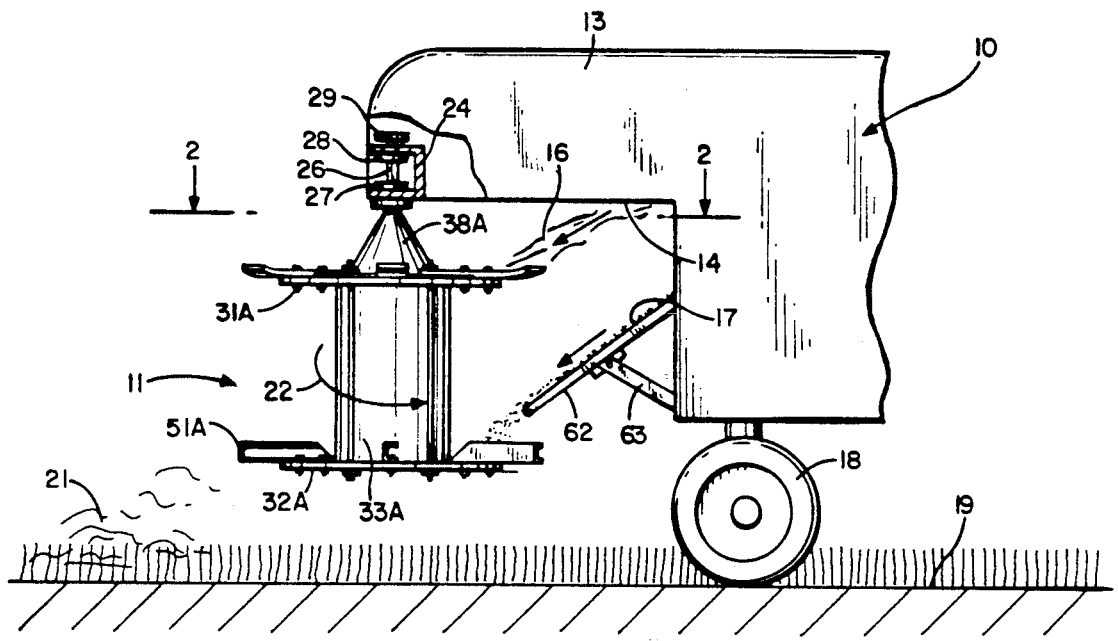
FIG. 1 is a side elevational view of the rear portion of an axial flow combine equipted with straw and chaff spreaders of the invention.

Referring to FIG. 1, there is shown a rear portion of a conventional axial flow combine indicated generally at 10 used to harvest small grains, beans, and corn. The combine separates the grain from the straw, debris, and chaff and discharges the straw, debris, and chaff onto the ground behind the combine. Combine 10 is equipped with straw and chaff spreaders 11 and 12 of the invention for evenly spreading straw, debris, and chaff on the ground and stubble behind combine 10. Combine 10 has a conventional housing 13 enclosing the grain straw and chaff separator structures (not shown) and delivering the straw and chaff to a rear opening 14 through which the straw and like course material 16 and chaff and like fine materials 17 are discharged toward straw and chaff spreaders 11 and 12. Housing 13 is movably supported on the ground 19 with a plurality of wheels 18. The straw and chaff spreaders 11 and 12 function to evenly distribute the straw and chaff indicated at 21 on the ground 19 behind combine 10.

Figure 2:
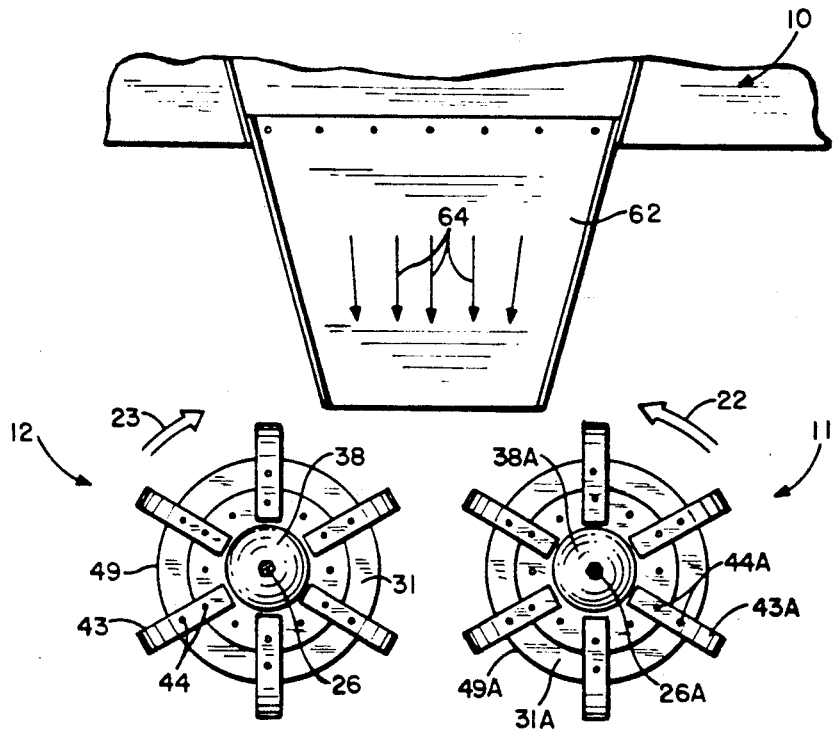
FIG. 2 is an enlarged sectional view taken along the line 2—2 of FIG. 1.

Referring to FIG. 2, the straw and chaff spreaders 11 and 12 are rotated in opposite directions as indicated by arrows 22 and 23 to distribute straw and chaff 21 in a relatively wide path or swath behind combine 10. The spread pattern is a relatively wide path behind the combine which minimizes bunching of straw on the ground and uneven chemical buildup.

Returning to FIG. 1, housing 13 has a transverse frame 24 which serves as a support for straw and chaff spreaders 11 and 12 behind opening 14. Straw and chaff spreaders 11 and 12 are identical in structure. The following description is limited to straw and chaff spreader 12. The parts of spreader 11 that correspond to parts of spreader 12 have the same reference number with the suffix A.

Figure 3:
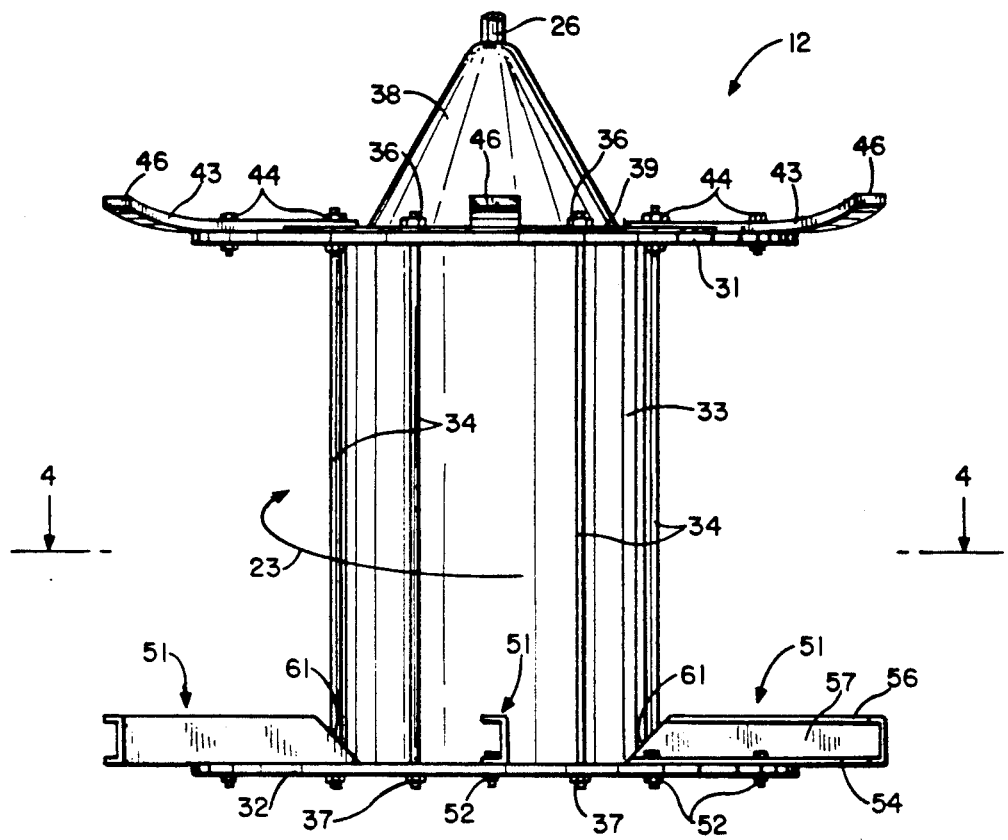
FIG. 3 is an enlarged elevational view of one straw and chaff spreader of FIG. 1.

As seen in FIGS. 1 and 3, spreader 12 has a generally upright shaft 26 rotatably mounted on frame 24 with a pair or bearings 27 and 28. A power drive 29, such as a chain and sprocket, belt and pulleys operatively connected to the upper end of shaft 26 functions to rotate the shaft to turn the straw and chaff spreader 12 in the direction of arrow 22. The speed of rotation of straw and chaff spreader 12 can be adjusted to vary the width and density of the spread pattern of straw and chaff 21 on the ground.

Straw and chaff spreader 12 has an upper or top disk 31 and a lower or bottom disk 32. Disks 31 and 32 a generally flat circular members having continuous circular outer peripherial edges 49 and 59. Disks 31 and 32 are made of rigid material, such as metal, plastic or the like. A tubular member or sleeve 33 is located between disks 31 and 32 to vertically space disks 31 and 32 apart. A plurality of upright rods 34 extend through holes in disks 31 and 32 around sleeve 33. Nuts 36 and 37 theaded onto opposite ends of the rods 34 clamp the disks 31 and 32 onto opposite ends of tubular sleeve 33. The opposite ends of sleeve 33 engage circular portions of disks 31 and 32 concentric with the longitudinal axis of shaft 26 to rotatably balance disks 31 and 32 and sleeve 33. This mounting relationship between disks 31 and 32 and sleeve 33 also supports and stablizes disks 31 and 32 on sleeve 33.

Figure 7:
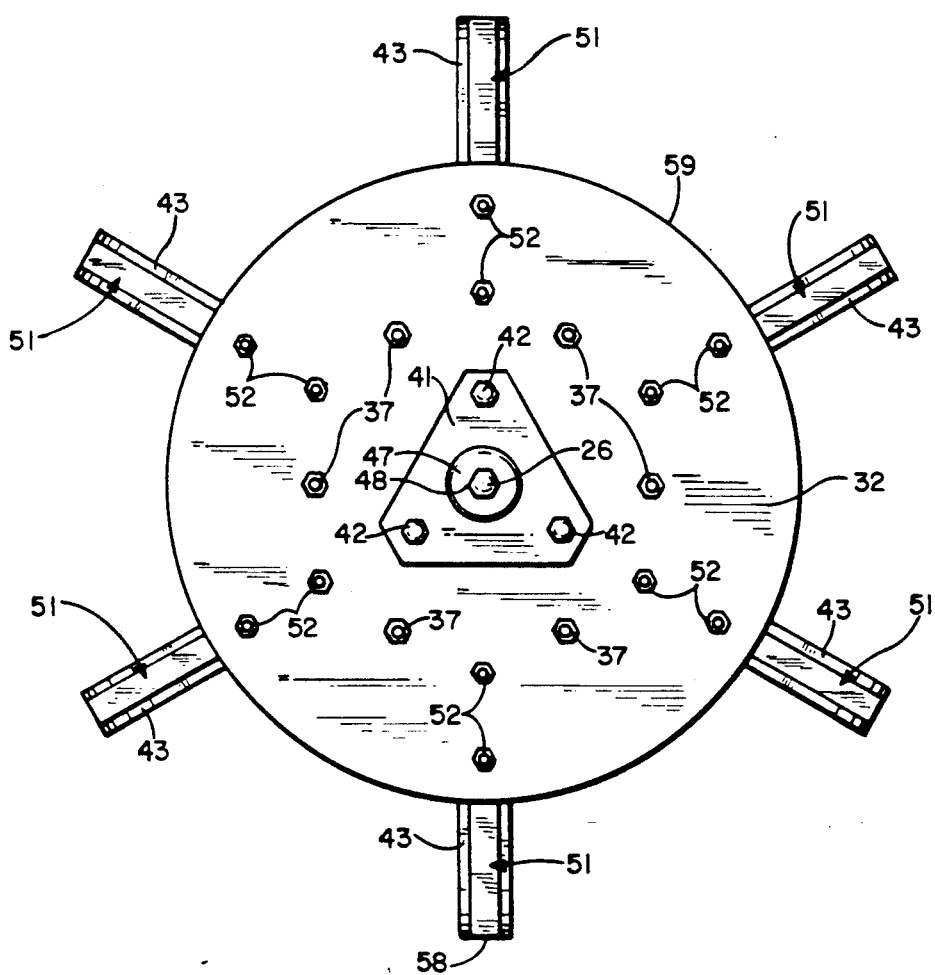
FIG. 7 is a bottom view of the straw and chaff spreader of FIG. 3.

An upwardly tapering cone member 38 is mounted on top of disk 31. Cone member 38 has an outwardly directed annular flange 39. The rods 37 extend through holes in flange 39. Nuts 36 threaded onto the upper ends of rods 34 secure flange 39 to disk 31. Other means can be used to attach the cone member 38 to disk 31. As shown in FIG. 1, cone member 38A extends upwardly to adjacent the bottom of transverse frame 24. The lower end of cone member 38 has a diameter generally the same as the outside diameter of sleeve 33 which is substantially smaller than the diameter of disk 31. The upper end of cone member 38 has a hole accommodating shaft 26 and a diameter slightly greater than the diameter of shaft 26. Cone member 26 guides straw and course material discharged through opening 14 outwardly onto disk 31 and arms 43 mounted thereon. Drive shaft 26 extends through cone member 38, disk 31, and tubular sleeve 33 into a plate 41 secured to the bottom of disk 32. As shown in FIG. 7, a plurality of bolts 42 secure plate 41 to disk 32. A plate 41 has a center hub 47 with a non-circular hole 48 accommodating the non-circular end of shaft 46 so as to transmitt torque from shaft 26 to disk 32 whereby spreader 12 rotates with shaft 26.

As shown in FIGS. 2 and 3, a plurality of outwardly directed arms 43 are secured to the top of disk 31. Nut and bolt assemblies 44 attach each arm 43 to disk 31. Arms 43 are circumferentially spaced around disk 31. The embodiment shown has five circumferentially spaced arms 43. The number of arms can be either increased or decreased. Arms 43 are generally rectangular members of elastic material, such as rubber or plastic, having outer ends that project generally radially outward from the outer peripheral edge 49 of disk 31. The terminal outer ends 46 of arms 43 are turned upward as shown in FIG. 3.

Figure 4:
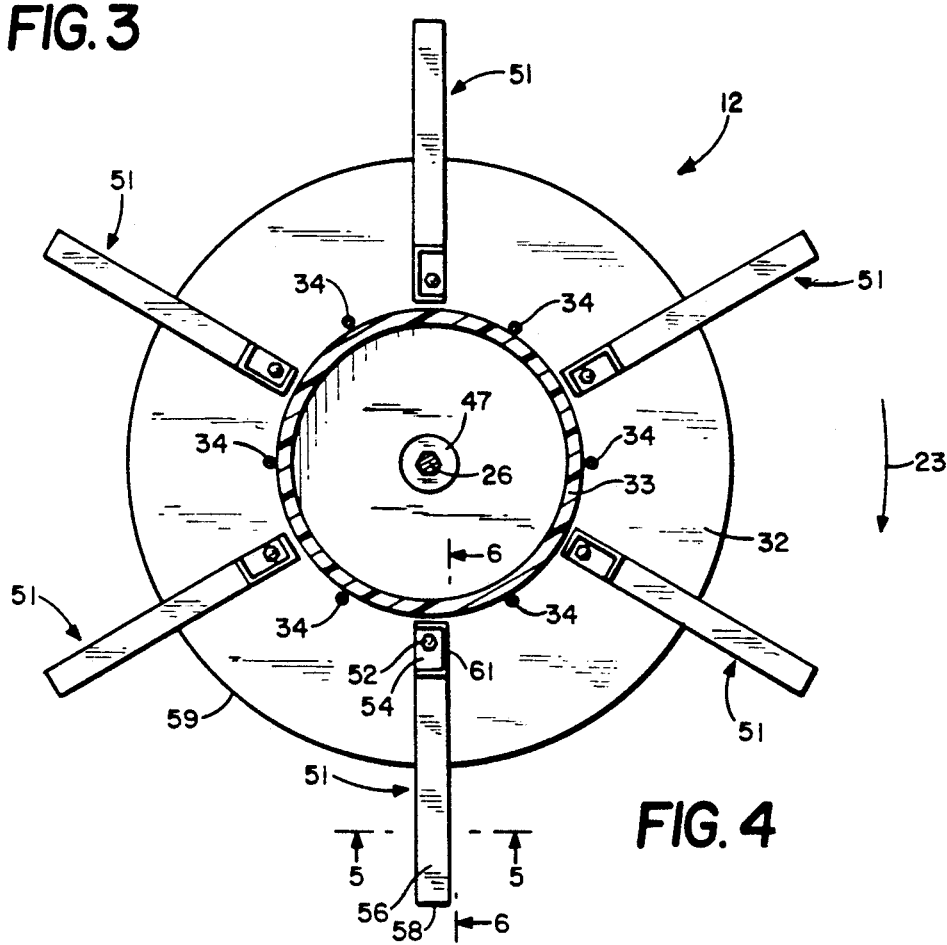
FIG. 4 is an enlarged sectional view taken along the line 4—4 of FIG. 3.
Figure 5:
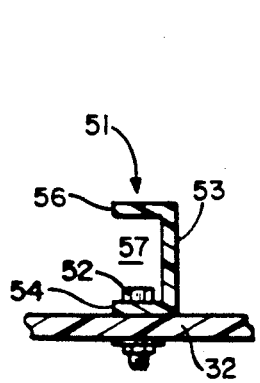
FIG. 5 is an enlarged sectional view taken along the line 5—5 of FIG. 4.
Figure 6:
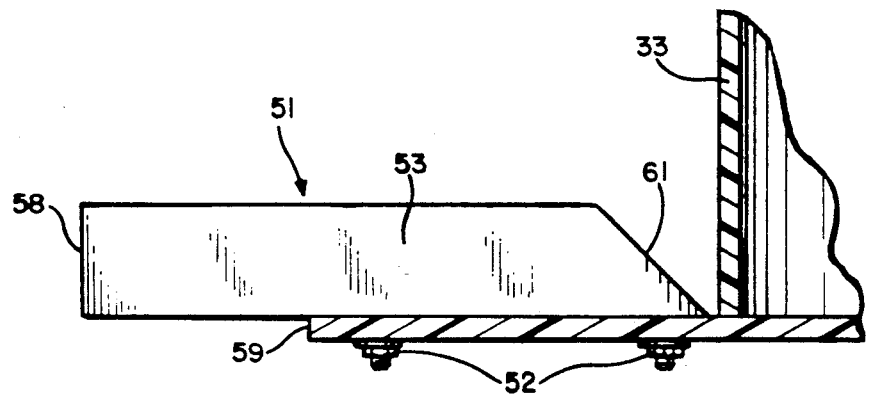
FIG. 6 is an enlarged sectional view taken along the line 6—6 of FIG. 4.

As shown in FIGS. 3 and 4, a plurality of outwardly directed channel shaped arms 51 are secured to top of disk 32 with a plurality of nut and bolt assemblies 52. Arms 51 are made of an abrasive and impact resistant plastic, such as ultra high molecular weight polyethylane. The plastic also has a low coefficient of friction and smooth surfaces so that chaff and particulate materials flow along the channels in arms 51. Each arm 51 has a generally radial upright back or base 53 joined to a bottom flange 54 located on top of disk 32 and a forwardly directed top flange 56. As shown in FIG. 5, the flanges 54 and 56 are vertically separated from each other to form a generally U-shaped channel 57 having a forward open side. The inner end of arm 51 is spaced outwardly from sleeve 33 to provide an inlet opening into channel 57 to allow air, chaff, an particulate material to flow along channel 57. The outer end 58 of arm 51 is open to allow air, chaff, and particulate material to flow radially along channel 57. One embodiment of straw and chaff spreader 12, as shown in FIG. 5, has six circumferentially spaced arms 51 equally spaced from each other around disk 32. The outer ends 58 of arms 51 are spaced radially outwardly from the outer peripheral edge 59 of disk 32. For example, the arms can extend ten centimeters beyond the outer peripheral edge 59 of disk 32. As seen in FIGS. 3, 4, and 6, the inner edge 61 of arms 51 tapers downwardly and inwardly toward sleeve 33 to provide inlet openings for air, chaff, and particulate material to flow into channel 57.

As shown in FIGS. 1 and 2, a shallow generally U-shaped pan or slide 62 extends rearwardly from the back of housing 13 toward the mouth between disks 31 and 32 to direct chaff and particulate materials as indicated by arrows 64 toward disks 31 and 31A. One or more support braces 63 attach pan 62 to the rear of combine 10 below opening 14. Pan 62 is downwardly inclined to facilitate movemnt of chaff along pan 62 and prevents discharge of chaff onto the ground in front of spreaders 11 and 12. Pan 62 is a shallow plastic trough having a low coefficient of friction to minimize the collection of material on pan 62.

In use, straw is moved by the shakers through combine housing 13 and discharged through opening 14 onto the rotating straw and chaff spreaders 11 and 12. Arms 43 and 43A mounted on the upper disks 30 and 31A propel and spread the straw in a rearward direction in a relatively even swath behind the combine. The chaff and particulate materials 17 emerge from the bottom of opening 14 onto pan 62. These materials flow down incline pan 62 into the adjacent portions of lower disks 32 and 32A and are picked up and propelled by arms 51 and 51A rearwardly and laterally behind the combine. The materials that are collected on disks 32 and 32A are carried by air flowing outwardly through channels 57 and are discharged through the open outer ends 58 of arms 51. The turning channel shaped arms 51 function as paddles or vanes that generates a rearwardly flowing air stream that carrys the straw, chaff and particulate materials rearwardly away from the back of combine 10 in a relatively wide spread pattern. The arms 51 are operable to spread the chaff and like materials laterally up to 16 feet behind combine 10 thereby minimize uneven material and chemical build up on the ground. The air moving through channels 57 facilitates the collection and scattering of the materials on the ground behind combine 10. The rotational speed of spreaders 11 and 12 can be changed to alter the width of the spread pattern of the straw, chaff and like materials.

While there has been shown and described a preferred embodiment of the straw and chaff spreader of the invention, it is understood that changes in the structure, arrangement of the structures and types of materials for the structures may be made by those skilled in the arm without departing from the invention. The invention is defined in the following claims.

I claim:

1. A straw and chaff spreader for use with a combine having a rear section with an opening for discharging straw and chaff therefrom comprising: an upright shaft adapted to be mounted on the combine rearwardly of the opening in the rear section thereof and rotated about a longitudinal axis thereof, a first disk, a second disk mounted on the shaft below the first disk for rotation with said shaft, means located between the first and second disks spacing said first and second disks apart including a tubular sleeve having a first end engagable with a circular portion of the first disk concentric with the shaft and a second end engagable with a circular portion of the second disk concentric with the shaft, fastener means securing the first and second disks to said means located between the first and second disks, said fastener means incuding a plurality of rods circumferentially spaced relative to said sleeve, means connecting the rods to the first and second disks to hold the first and second disks in engagement with the first and second ends of the sleeve, an upwardly tapering cone member surrounding the shaft mounted on the first disk, a plurality of circumferentially spaced first arms extended outwardly from the first disk, means mounting the first arms on the first disk, a plurality of circumferentially spaced second arms extended outwardly from the second disk, each of said second arms having a channel shaped cross section with an upright generally radial back, a bottom flange, and a top flange projected forwardly relative to the direction of rotation of the shaft, and means securing the bottom flange to said second disk whereby upon rotation of said shaft the first disk and first arms thereon are rotated to spread straw discharged through said opening, and the second disk and second arms thereon are rotated to spread chaff discharged through said opening onto the ground behind the combine.

each of the first arms

2. The spreader of claim 1 wherein:
each of the first arms is an elongated flexible member.

3. The spreader of claim 1 wherein:
each of the second arms is a plastic channel shaped member.

4. The spreader of claim 1 wherein:
each of the second arms is a channel shaped member having an outer end, an inner end tapered inwardly and downwardly toward said sleeve and a channel between said inner and outer ends, said channel being open at the opposite ends thereof for carrying chaff outwardly from the second disk.

5. The spreader of claim 1 wherein:
each of the first arms is an elogated flexible member, and each of the second arms is a channel shaped member having an outer end, an inner end, and a channel between said inner and outer ends, said channel being open at the opposite ends thereof for carrying chaff outwardly from the second disk.

6. A straw spreader for use with a combine having a rear section with an opening for discharging straw and chaff therefrom comprising:
an upright shaft adapted to be mounted on the combine rearwardly of the opening in the rear section thereof and rotated about a longitudinal axis thereof,
a first disk surrounding the shaft for rotation with said shaft,
a second disk mounted on the shaft below the first disk for rotation with said shaft,
means located between the first and second disks spacing said first and second disks apart including a tubular sleeve having a first end engagable with the first disk and a second end engagable with the second disk,
fastener means extended between and engagable with the first and second disks to retain the sleeve between the first and second disks,
an upwardly tapering cone member surrounding the shaft mounted on the first disk, a plurality of circumferentially spaced first arms extended outwardly from the first disk,
each of said first arms comprising an elongated flexible member,
means mounting the first arms on the first disk, a plurality of circumferentially spaced second arms extended outwardly from the second disk,
each of said second arms having a channel spaced cross section with an upright generally radial back, a bottom flange,
and a top flange projected forwardly relative to the direction of rotation of the shaft,
and means securing the bottom flange to said second disk whereby upon rotation of said shaft the first disk and first arms thereon are rotated to spread straw discharged through said opening,
and the second disk and second arms thereon are rotated to spread chaff discharged through said opening onto the ground behind the combine,
each of the second arms is a channel shaped member having an outer end,
and an inner end tapered inwardly and downwardly,
and a channel between said inner and outer ends,
said channel being open at the opposite ends thereof for carrying chaff outwardly from the second disk.

7. The spreader of claim 6 wherein:
the first disk and second disk are circular members having generally the same diameters.

8. The spreader of claim 6 wherein:
each of the channel shaped members is plastic, and the outer ends extend outwardly from the second disk.

9. The spreader of claim 6 wherein:
the second disk includes a circular member having an upper surface, said second arms being mounted on said upper surface of the circular member and extending outwardly from an outer edge thereof.

10. The spreader of claim 6 wherein:
the fastener means includes a plurality of rods circumferentially spaced around the sleeve, and means connecting the rods to the first and second disks to hold the first and second disks in engagement with the sleeve.

11. In combination:
a combine having a rear section with a frame and an opening for discharging straw and chaff therefrom,
an upright shaft extended downwardly from said frame,
means rotatably mounting said shaft on said frame,
means for rotating said shaft about a longitudinal axis thereof,
a second disk mounted on the shaft below the first disk for rotation with said shaft,
sleeve means located between said first and second disks surrounding said shaft spacing said first and second disks apart,
fastener means extended between and engagable with the first and second disks to retain said sleeve means between the first and second disks,
an upwardly tapering cone member surrounding the shaft mounted on the first disk,
a plurality of circumferentially spaced first arms extended outwardly from the first disk,
means mounting the first arms on the first disk, a plurality of circumferentially spaced second arms extended outwardly from the second disk,
each of said second arms is a channel shaped member having a channel shaped cross section,
an outer end,
an inner end tapered inwardly and downwardly,
a bottom flange,
a top flange projected forwardly relative to the direction of rotation of the shaft and a channel extended along the length thereof between said inner and outer ends,
said channel being open at the opposite ends thereof for carrying chaff outwardly from the second disk,
and means securing the bottom flange to said second disk whereby upon rotation of said shaft the first disk and first arms thereon are rotated to spread straw discharged through said opening,
and the second disk and second arms thereon are rotated to spread chaff discharged through said opening onto the ground behind the combine.

12. The combination of claim 11 including: pan means mounted on the combine below the opening thereof extended rearwardly for directing chaff onto the second disk.

13. The combination of claim 11 wherein the sleeve means located between the first and second disks is a tubular sleeve having a first end engageable with a circular portion of the first disk concentric with the shaft and a second end engageable with a circular portion of the second disk concentric with the shaft.

14. The combination of claim 11 wherein:
each of the first arms is an elongated flexible member.

15. The combination of claim 11 wherein:
each of the first arms is an elongated flexible member having outer ends that extend beyond an outer edge of the first disk, and each of the channel shaped members outer ends extend beyond an outer edge of the second disk.

16. The combination of claim 11 wherein:
the second disk includes a circular member having an upper surface, said second arms being mounted on said upper surface of the circular member and extended outwardly from an outer edge thereof.

17. The combination of claim 11 wherein:
the fastener means includes a plurality of rods circumferentially spaced around the sleeve means, and means connecting the rods to the first and second disks to hold the first and second disks in engagement with the sleeve means.

* * * * *